F. C. REYNOLDS.
PHOTOGRAPHIC CAMERA.
APPLICATION FILED APR. 27, 1915.
1,295,062.
Patented Feb. 18, 1919.
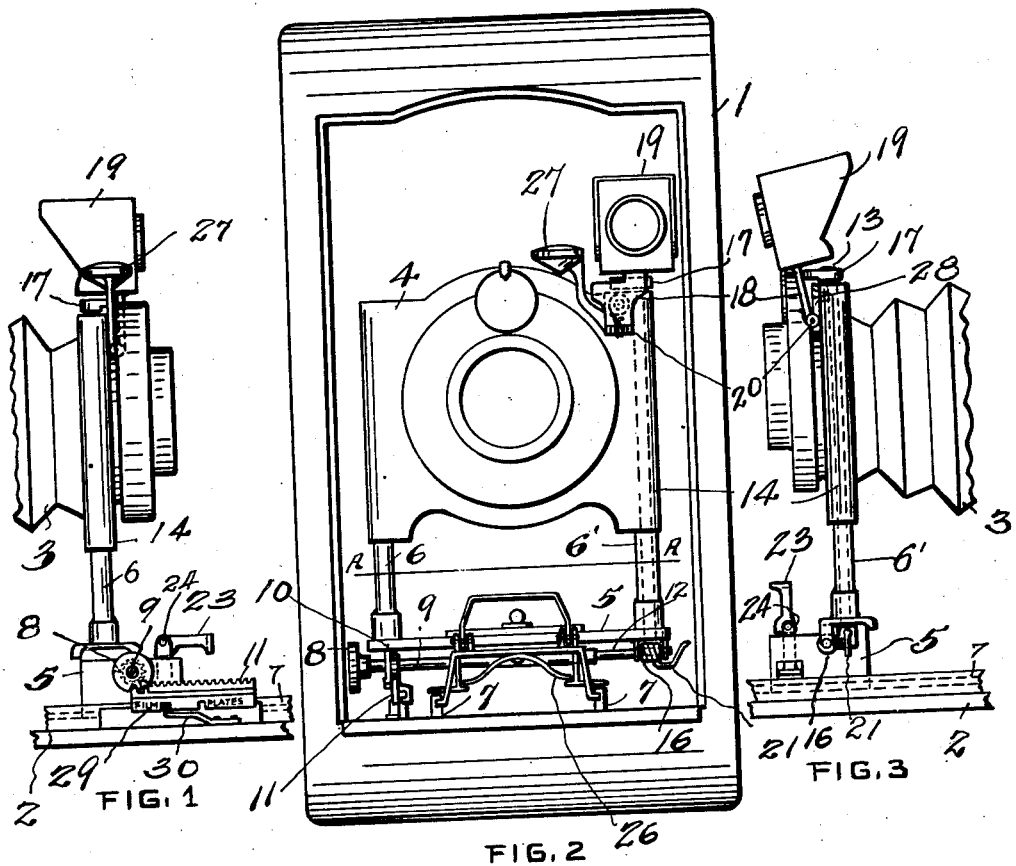
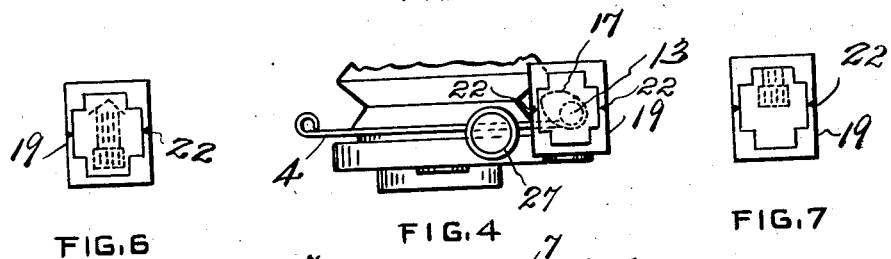
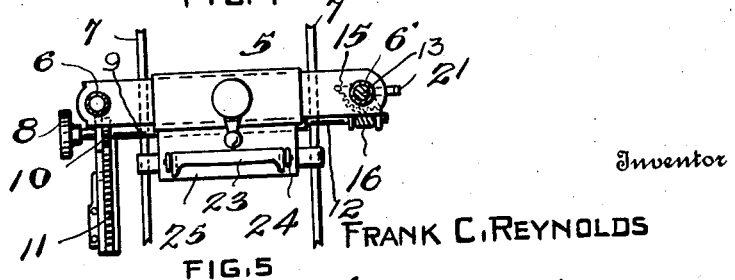
Inventor
FRANK C. REYNOLDS
By Shigley & Harney
Attorneys

UNITED STATES PATENT OFFICE.

FRANK C. REYNOLDS, OF COLUMBUS, OHIO.

PHOTOGRAPHIC CAMERA.

1,295,062.  Specification of Letters Patent.  Patented Feb. 18, 1919.

Application filed April 27, 1915. Serial No. 24,343.

*To all whom it may concern:*

Be it known that I, FRANK C. REYNOLDS, a citizen of the United States of America, residing at Columbus, in the county of Franklin and State of Ohio, have invented certain new and useful Improvements in Photographic Cameras, of which the following is a specification.

The present invention relates to improvements in photographic cameras, and is designed especially for the purpose of providing a focusing device, by means of which the camera may be without the necessity of using distance scales.

The invention consists in certain novel combinations and arrangements of parts as will be more fully hereinafter described and claimed.

In the accompanying drawings, I have illustrated one complete example of the physical embodiment of my invention in connection with a folding camera, constructed and arranged according to the best mode I have so far devised for the practical application of the principles of my invention.

Figure 1 is a side view of the front portion of a photographic camera showing a standard finder and my invention applied thereto for the purpose of operating the finder.

Fig. 2 is a front elevation of a photographic camera with my invention applied thereto.

Fig. 3 is a left-side view in elevation of the front portion of the camera with the carriage in locked position.

Fig. 4 is a top plan view of the tiltable finder showing its relation to the front plate or lens frame of the camera.

Fig. 5 is a sectional view on line A—A of Fig. 2.

Fig. 6 is a plan view of the finder in normal position.

Fig. 7 is a top plan view of the finder showing it in tilted position.

In illustrating my invention, I have utilized the standard type of folding camera, as 1, which is equipped with the bed or base-board 2, the bellows 3, the front plate 4, which is supported from the carriage 5, by the telescopic posts 6, 6', and the track 7, 7, upon which the carriage 5 slides. The action of focusing the camera is accomplished as usual by means of the hand-wheel 8, the telescopic shaft 9, the pinion 10 on said shaft, and the rack-plate 11, which is attached to the bed 2 as usual. It will be understood that the lens portion of the camera is extended or withdrawn when focusing by movement of the hand-wheel 8. The telescopic shaft 9 of the hand-wheel is made up of two sections, the section 12 fitting in the section 9, and the whole shaft is carried by the carriage 5 as best seen in Fig. 5.

The front plate 4 is movable vertically as usual, on the telescopic posts 6 and 6'.

The post 6' includes a vertical shaft 13, which extends from the carriage 5 upwardly and is incased by the sleeve 14 on the front plate 4. At its lower end this shaft 13 is provided with a fixed segmental gear 15, which engages a worm-gear 16, carried by the shaft section 12, which is employed in focusing the camera. Thus, when the hand-wheel 8 is turned, the horizontal telescoping shaft 9—12 is turned, and through the geared connection the vertical shaft 13 is revolved. The movement of the shaft is limited, and it is designed to operate the the cam plate 17, carried at the upper end of the shaft. This cam plate 17 contacts with a bracket 18, which carries a tiltable finder 19, and is pivoted at 20 to the front plate 4 of the camera. This pivot 20 is formed as a spring hinge joint, so that the finder may be tilted forward with relation to the camera when the hand-wheel 8 is revolved to advance the lens and returned by the action of the spring when the hand wheel 8 is revolved in reverse direction to retract the lens.

In connection with the worm-gear 16 and segmental gear 15, I employ a catch-release 21, by means of which the vertical shaft may be disengaged from the worm-gear so that the finder may be returned to normal position after the focus has been attained, without disturbing the adjusted position of the camera.

The finder 19 is equipped with the usual indicating points 22, so that the image may be located in the finder in the usual way, as seen in Fig. 6, and then the finder is tilted until the base-line of the image coincides with the center line or indicator point 22 of the finder, as illustrated in Fig. 7. When this has been accomplished, the camera is thereby set in focus for an object located at the distance of the object sighted upon without further attention of the operator.

A cam-actuated locking handle 23 is pivoted at 24, on the plate 25 of the carriage, and this locking handle provides for locking the carriage in any adjusted position on the tracks 7. The spring leaf 26 is employed to frictionally hold the carriage down upon the tracks when the handle 23 is turned up, as in Figs. 2, 3 and 5.

A fixed spirit level 27 is illustrated in Figs. 1, 2 and 4, this spirit level being fixed to the finder bracket arm 28, which is rigid with the front plate 4, but it will be understood that the spirit level forms no part of the present invention.

The spring hinge of the finder bracket holds the finder in position at all times against the cam 17, and in Fig. 2, it will be seen that the bracket is offset from the shaft 13, so that the cam 17 normally stands at an angle of about 45° to the bracket of the finder. This condition applies, and the travel of the cam against the bracket is the same whether the finder is in vertical position as in Fig. 2, or whether it is turned down for horizontal exposures.

The handle 23 is grasped when pulling out or closing the bellows, and the carriage may be locked in the desired position before the hand is removed from the handle, by turning up the handle to the position in Figs. 2, 3 and 5. This construction of handle and carriage eliminates the objectionable straining or twisting of the bed or front of the camera, and the handle affords a more facile opening and closing means, which must be locked before the unfolded camera is folded into position.

In operating the camera the front of the camera is pulled out until the pinion 10 reaches the near end of the rack-plate 11, as in Figs. 1 and 5. The image to be photographed is now located in the finder in the usual way as indicated in Fig. 6, and then the hand-wheel 8, is revolved and the pinion 10 in the rack-plate causes the carriage to move forward for the purpose of focusing the camera, while the cam 17 tilts forward the finder until the base line of the image reaches the position in Fig. 7. The closer the object is to the camera the farther the front will be extended and the lens brought nearer to the object in order that the base line may coincide with the center line 22 of the finder, and the greater the distance of the object from the camera the less will the camera front be extended and consequently the lens will not be brought as near to the object as in the case when the object is relatively close.

If an object is 15' distant from the camera, when the finder is tilted to position in Fig. 7 with the base line coinciding with the center marks 22 the lens must be moved forward to a certain point to bring the object to position in Fig. 6. Now, if the same object is moved a distance of 25' from the camera the base line of the object appears closer to the points 22, and therefore the finder need not be tilted so far in order to make the base line coincide with the points 22, and the lens is not moved so far out on the camera bed. Thus the varying distance of an object from the camera requires a corresponding variation in the adjustment of the lens, and as the lens and finder move simultaneously, it will readily be seen that the adjustment of the finder to make the base line of the object coincide with the indictator points 22, and of the lens is accomplished simultaneously. The camera is thus focused, so that the picture may now be taken.

With this device, the focus on a moving image may be instantly changed by manipulating the hand-wheel 8, and the eye need not be removed from the finder, as no attention is necessary for the adjustment, except to keep the finder within the vision of the eye and hold the hand upon the hand-wheel 8.

In using plates, or films, the focal plane is taken care of by sliding the adjustable rack 29, which is held in adjusted position by the spring 30 in Fig. 1.

I claim:

The combination with the extensible lens holder and tiltable finder carried thereby, a carriage supporting the holder and a rack carriage supporting the holder and a rack wheel and shaft carried by said carriage, a stationary rack plate rigid with an immovable part of the camera, a cam shaft and a segment gear thereon, and a worm gear on said rack shaft co-acting with the segmental gear, and a cam carried by the cam shaft bearing upon a portion of the finder to tilt the same when the rack shaft is revolved.

In testimony whereof I affix my signature.

FRANK C. REYNOLDS.